US009669957B2

(12) United States Patent
Ishii et al.

(10) Patent No.: US 9,669,957 B2
(45) Date of Patent: Jun. 6, 2017

(54) SYNTHETIC RESIN BOTTLE

(71) Applicant: YOSHINO KOGYOSHO CO., LTD., Tokyo (JP)

(72) Inventors: Yusuke Ishii, Tokyo (JP); Takashi Otsuka, Mouka (JP); Katsuyoshi Inagawa, Mouka (JP); Takao Iizuka, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 482 days.

(21) Appl. No.: 13/863,967

(22) Filed: Apr. 16, 2013

(65) Prior Publication Data
US 2013/0228545 A1 Sep. 5, 2013

Related U.S. Application Data

(62) Division of application No. 12/451,728, filed as application No. PCT/JP2008/060073 on May 30, 2008, now Pat. No. 8,440,131.

(30) Foreign Application Priority Data

May 31, 2007 (JP) .................. 2007-145918
Dec. 27, 2007 (JP) .................. 2007-335963

(51) Int. Cl.
*B65B 7/28* (2006.01)
*B65D 1/02* (2006.01)
(Continued)

(52) U.S. Cl.
CPC ............ *B65D 1/0207* (2013.01); *B29B 11/14* (2013.01); *B29C 49/0073* (2013.01);
(Continued)

(58) Field of Classification Search
CPC .......... B65D 1/0223; B29B 2911/1402; A45D 34/00; A45D 40/265
(Continued)

(56) References Cited

U.S. PATENT DOCUMENTS 2,791,789 A * 5/1957 Smith et al. .................. 401/119
4,540,544 A 9/1985 Jakobsen et al.
(Continued)

FOREIGN PATENT DOCUMENTS

JP          A-5-8287         1/1993
JP          A-6-285961      10/1994
(Continued)

OTHER PUBLICATIONS

International Search Report dated Aug. 26, 2008 from International Application No. PCT/JP2008/060073.

*Primary Examiner* — Shawn M Braden
(74) *Attorney, Agent, or Firm* — Oliff PLC

(57) ABSTRACT

A technical problem is to fully make up for a restricted upper limit to the preform body wall thickness. An object is to provide a bottle which is narrow-mouthed and yet has a substantially expanded body. In principle, the bottle may include a mouth opening portion with a bore diameter of 10 mm or less and a maximum diameter of the body is 2.5 times or more than the bore diameter of the mouth opening portion, and wherein a maximum diameter portion of the body has a minimum wall thickness of 0.45 mm or more.

7 Claims, 4 Drawing Sheets

(51) Int. Cl.
*B29B 11/14* (2006.01)
*B29C 49/00* (2006.01)
*B29B 11/08* (2006.01)
*B29C 49/06* (2006.01)
*B29K 23/00* (2006.01)
*B29K 105/00* (2006.01)
*B29L 31/00* (2006.01)

(52) U.S. Cl.
CPC ............ *B65D 1/0223* (2013.01); *B29B 11/08* (2013.01); *B29B 2911/1402* (2013.01); *B29B 2911/1404* (2013.01); *B29B 2911/14026* (2013.01); *B29B 2911/14033* (2013.01); *B29B 2911/1444* (2013.01); *B29B 2911/1476* (2013.01); *B29B 2911/14106* (2013.01); *B29B 2911/14133* (2013.01); *B29B 2911/14326* (2013.01); *B29B 2911/14333* (2013.01); *B29B 2911/14486* (2013.01); *B29B 2911/14666* (2013.01); *B29B 2911/14753* (2013.01); *B29C 49/06* (2013.01); *B29K 2023/12* (2013.01); *B29K 2105/258* (2013.01); *B29L 2031/7158* (2013.01)

(58) Field of Classification Search
USPC .......................................................... 215/44
See application file for complete search history.

(56) References Cited

U.S. PATENT DOCUMENTS

| | | | |
|---|---|---|---|
| 4,564,495 | A | 1/1986 | Nilsson et al. |
| 4,572,224 | A * | 2/1986 | Rosenwinkel ....... A45D 34/046 132/218 |
| 4,588,620 | A * | 5/1986 | Marcinek ................ B29C 45/26 215/44 |
| 4,917,520 | A * | 4/1990 | Reid .............................. 401/127 |
| 5,248,533 | A | 9/1993 | Sugiura et al. |
| 5,389,332 | A | 2/1995 | Amari et al. |
| D432,721 | S * | 10/2000 | Lerolle ........................... D28/76 |
| 6,186,685 | B1 * | 2/2001 | Salemme .......................... 401/6 |
| 6,257,788 | B1 * | 7/2001 | Gueret ................. A45D 40/265 401/126 |
| 6,312,180 | B1 * | 11/2001 | Panda ........................... 401/130 |
| 6,315,140 | B1 * | 11/2001 | Nadel ............................ 215/354 |
| 7,051,890 | B2 | 5/2006 | Onoda et al. |
| 7,118,298 | B2 * | 10/2006 | Tsutsumi ...................... 401/129 |
| 7,624,741 | B2 * | 12/2009 | Jonckheere .......... A45D 34/048 132/218 |

FOREIGN PATENT DOCUMENTS

| | | |
|---|---|---|
| JP | A-6-305006 | 11/1994 |
| JP | A-9-52278 | 2/1997 |
| JP | A-2002-145238 | 5/2002 |

* cited by examiner

SYNTHETIC RESIN BOTTLE

This is a Division of U.S. application Ser. No. 12/451,728 filed Nov. 27, 2009, which is a U.S. National Phase of Application No. PCT/JP2008/060073 filed May 30, 2008, which claims the benefit of Applications JP 2007-335963 filed Dec. 27, 2007 and JP 2007-145918 filed May 31, 2007. Each of the disclosures of the prior applications is hereby incorporated by reference herein in its entirety.

TECHNICAL FIELD

This invention relates to a synthetic resin bottle and especially a biaxially drawn, blow molded bottle of a small sized and narrow-mouthed type, which is used as a makeup container for mascara and eyeliner, and to a process for molding the same.

BACKGROUND ART

Patent Document 1 describes an invention concerning a biaxially drawn and blow molded bottle made of a polypropylene resin and a process for molding the same.
[Patent Document 1] JP-1997-52278

DISCLOSURE OF THE INVENTION

Problems to be Solved by the Invention

In recent years, many biaxially drawn, blow molded bottles have been in use in the field of small-sized, narrow-mouthed bottles to be filled with makeup liquids, such as mascaras and eyeliners. The mouth opening portion of narrow-mouthed bottles of this type has a bore diameter of about 10 mm or less. Meanwhile, injection-molded preforms to be biaxially drawn and blow molded into bottles have a shape of a test tube. The mouth opening portion is disposed in an upper portion, and is in the same shape as that of the bottles molded from these preforms. Due to the restriction on the structure of the injection mold, the preform body has a peripheral outer surface of an almost right circular cylinder. The outer diameter of the preform body is limited to a length somewhat larger than that of the mouth opening portion. Because cooling water is passed through the injection core mold, there is a limitation in decreasing the diameter of the core mold. There is also a limitation in decreasing the bore diameter of the preform body and increasing the thickness of the body.

Because of the above-described limitations on the preform shape, the preform body wall thickness has to be set in a limited range. Especially in a case where the bottle has a substantially expanded body over the entire height range of the body or in a part of the height range, the expanded portion cannot have sufficient thickness. In that case, if the body is squeezed with fingers in the vicinity of the expanded portion, the body wall would easily get dented, and the contents may instantly burst outside. The bottle does not only give damage to its functions, but also it fails to feel well to the touch and fails to give the image of high quality, thus affecting merchantability of the product.

This invention has been made to solve the above problems found in prior art. A technical problem to be solved by this invention is to create a biaxially drawing and blow molding process that can fully make up for a restricted upper limit to the preform body wall thickness. An object of this invention is to provide a biaxially drawn, blow molded bottle which is narrow-mouthed and yet has a substantially expanded body.

Means of Solving the Problems

This invention will be described below with respect to a process for molding a synthetic resin bottle and a synthetic resin bottle made by this process. The molding process is the first to be taken up. In principle, the molding process of this invention to solve the technical problem comprises three steps of:

(1) injection molding a preform in the shape of a test tube taller than the bottle wherein the preform has a cylindrical mouth opening portion disposed in an upper part of the preform, and wherein the mouth opening portion of the preform serves also as a mouth opening portion of the bottle product;

(2) thermally shrinking the preform from an initial height so that portions other than the mouth opening portion of the preform would have a height that is smaller than that of the bottle; and (3) setting this thermally shrunk preform in a blow mold and biaxially drawing and blow molding the preform into the bottle.

How much thickness the body of a biaxially drawn, blow molded bottle can have would depend on how much weight the portions other than the mouth opening portion of the preform can have. The above-described molding process of this invention is intended to increase this weight by injection molding the preform preliminarily to a height larger than that of the bottle.

Then, the tall preform is thermally shrunk so that the portions other than the mouth opening portion of the preform would have a height smaller than that of the portions other than the mouth opening portion of the bottle. Biaxial drawing and blow molding can be performed by setting the shrunk preform in a split mold used for that purpose. Since the initial preform has a greater height than the bottle, naturally the preform has a larger weight. Even in the case of a narrow-mouthed bottle having a relatively large expanded portion, the bottle would have a sufficient wall thickness.

The larger the extent to which the preform is thermally shrunk, the higher the vertical draw ratio would be in the biaxial drawing and blow molding. When a high rate of thermal shrinkage is combined with the effect of drawing in the lateral direction, the resultant bottle would have higher rigidity than normal.

Another molding process of this invention comprises that, in addition to the principal molding process described above, a bore diameter of 10 mm or less is set for the mouth opening portion of the preform and that a draw ratio of 2.0 times or more in the lateral direction is set for a maximum diameter portion of the bottle body.

The preform body diameter is roughly determined by the diameters of the mouth opening portion of the bottle product. The minimum body wall thickness is determined by this preform body diameter and by the draw ratio in the lateral direction to be set for the maximum diameter portion of the bottle body. The molding process of this invention ensures a large action-and-effect to be performed in the biaxial drawing and blow molding of a bottle that is narrow-mouthed and yet has a substantially expanded portion in a part or in an almost entire height range of the body. Such a bottle is obtained under conditions that the mouth opening portion of the preform has a bore diameter of 10 mm or less and that the maximum diameter portion of the bottle body has a draw ratio of 2.0 times or more in the lateral direction.

Still another molding process of this invention comprises that the portions other than the mouth opening portion of the preform has a rate of thermal shrinkage in a range of 10 to 50%.

It is preferred that the preform has a rate of thermal shrinkage in the range of 10 to 50%. At a rate less than 10%, no effective weight increase can be expected. At a rate exceeding 50%, the preform could not help but shrink in a distorted shape because at such a rate, uniform drawing would become difficult in the biaxial drawing and blow molding operation.

Still another molding process of this invention comprises that thermal shrinkage of the preform and preliminary heating for biaxially drawing and blow molding the preform are conducted simultaneously.

The molding steps can be simplified by simultaneously conducting the thermal shrinkage of the preform and the preliminary heating for the biaxial drawing and blow molding step. Naturally it is preferred to conduct these two steps separately if there is a large difference between the temperature best suited to the thermal shrinkage and the temperature suited to the biaxial drawing and blow molding step.

Still another molding step of this invention comprises that the synthetic resin used in this invention is selected from a group comprising the resins of polypropylene series, polyethylene naphthalate series, and polyacrylonitrile series.

The rate of preform shrinkage in the height direction caused by heating is determined mainly by the type of synthetic resins and the heating temperature. Among the synthetic resins used in the biaxial drawing and blow molding, the resins of the polypropylene (PP) series, the polyethylene naphthalate (PEN) series, and the polyacrylonitrile (PAN) series show relatively high rates of thermal shrinkage.

The second to be taken up is the synthetic resin bottle of this invention, which can be molded by the above molding process of this invention. The synthetic resin bottle is a biaxially drawn, blow molded bottle having the mouth opening portion disposed on the body. The bottle is mainly characterized in that the mouth opening portion has a bore diameter of 10 mm or less and that the maximum diameter of the body is 2.5 times or more, or even 3.0 times or more, as much as the bore diameter of the mouth opening portion.

The narrow-mouthed bottle having a mouth bore diameter of 10 mm or less has limitations in the attempt to thicken the body wall of the preform in the shape of a test tube, which is used as a precursor in the above-described biaxial drawing and blow molding. The restricted upper limit to the preform body thickness can be supplemented to a satisfactory level by the above-described process for molding the synthetic resin bottle of this invention, i.e., by the process for thermally shrinking the preform having a greater height than that of the bottle product. The body wall thickness can be kept at a satisfactory level even if the body is expanded to a maximum diameter 2.5 times or more as much as the bore diameter of the mouth opening portion, or even 3.0 times or more, depending on the bore diameter of the mouth opening portion and the type of the resin to be used. Thus, it becomes possible to provide a unique, synthetic resin bottle having a narrow mouth and yet having a substantially expanded body, made by the biaxially drawing and blow molding process.

Another construction of the synthetic resin bottle of this invention is that, in addition to other features, the maximum diameter portion of the body has a minimum thickness of 0.45 mm or more.

At a minimum thickness of 0.45 mm or more for the maximum diameter portion of the body, the body wall would not get dented easily by squeezing the areas nearby the expanded body portion with fingers.

Still another construction of the synthetic resin bottle of this invention comprises that the mouth opening portion is disposed on the body by way of a neck portion in a shape of a right circular cylinder and that the neck portion has a minimum outer diameter ranging from the outer diameter of the mouth opening portion to 2.0 times or less as much as the bore diameter of the mouth opening portion.

The above construction adds a new shape element to the bottle. This neck portion connected to the mouth opening portion is formed by biaxially drawing and blow molding the preform body in the same way as the bottle body is formed. The length and diameter of this neck portion, along with a cap fitted around this neck portion, give the bottle highly characteristic appearance. For use as a container for make-up liquids, such as mascaras or eyeliners, the bottle can be provided with a funnel-shaped squeezer, which can be fitted by utilizing an overhang formed on an inner peripheral wall at a lower end of the mouth opening portion at the time when the neck portion is formed.

If the minimum outer diameter of the neck portion is set at a level considerably smaller than the maximum diameter of the body, e.g., 2.0 times or less as much as the mouth bore diameter, then attention has to be paid to the drawing in the lateral direction in the biaxial drawing and blow molding at the upper end of the preform body to be molded into this neck portion and to the ways to circumvent troubles, such as dragging caused by the split blow mold. If these points are taken into consideration, limitations would become stronger in the ways to increase the outer diameter of the preform body. Therefore, in combination with the bore diameter of the mouth opening portion as small as about 10 mm or less, the upper limit to the preform body wall thickness would have to be restricted more and more. The molding process of this invention can make up for the restricted upper limit to the preform body wall thickness, thus making it possible to provide the bottle having above construction. By the way, this neck portion may also have the shapes of a right elliptical cylinder, a right oval cylinder, or a right square cylinder, in addition to the shape of a right circular cylinder. If the neck portion has a shape other than the right circular cylinder, the diameter would change in the peripheral direction. But since the minimum outer diameter limits any increase in the outer diameter of the preform body, the above construction specifies a constructive requirement that "the neck portion has a minimum outer diameter ranging from the outer diameter of the mouth opening portion to 2.0 times or less as much as the bore diameter of the mouth opening portion."

Still another construction of the synthetic resin bottle of this invention comprises that a screw thread is notched on the outer peripheral surface of the mouth opening portion and that a cap in a roofed cylindrical shape is screwed on the mouth opening portion so as to cover the neck portion softly.

Under the above construction, the container has a characteristic external appearance, which can be achieved by combining the shape of the neck portion, an expanded shape of the body, and the cap.

Still another construction of the synthetic resin bottle of this invention comprises that the bottle is utilized as a container for accommodating a makeup liquid such as mascara or eyeliner.

The bottle of this invention is narrow-mouthed and yet has a substantially expanded body. The bottle may be provided with a slim neck portion. When combined with a cap and an application unit, the bottle can be utilized as a container for a makeup liquid, such as mascara or eyeliner. Furthermore, because of its new and unique shape, the bottle can be differentiated from other make-up containers.

Still another construction of the synthetic resin bottle of this invention comprises that a resin of the polypropylene series (hereinafter referred to as a PP resin) is used as the synthetic resin material for the bottle.

The PP resins are crystalline materials. These resins have the drawing properties largely dependent on temperatures in the biaxial drawing and blow molding, and tend to have considerably uneven body wall thickness. Thus, it has so far been difficult to biaxially draw and blow mold the preforms into the narrow-mouthed bottles having a substantially expanded body. On the other hand, the PP resins are the materials capable of having the rate of thermal shrinkage increased in the direction of preform height. The molding process of this invention can make up for the restricted upper limit to the preform body thickness to a satisfactory level. In other words, the process of this invention enables the preform to have a sufficiently high average wall thickness so as to be able to supplement uneven wall thickness. Therefore, it has become possible to provide a new, narrow-mouthed PP resin bottle having a substantially expanded body.

Still another construction of the synthetic resin bottle of this invention comprises that synthetic resin to be used in this invention is selected from a group comprising a polyethylene naphthalate (PEN) resin and a polyacrylonitrile (PAN) resin.

The polyethylene naphthalate (PEN) resins and the polyacrylonitrile (PAN) resins are amorphous materials, but have relatively high glass transition temperatures. These resins, too, have the drawing properties largely dependent on temperatures in the biaxial drawing and blow molding, and tend to have considerably uneven body wall thickness. And like the PP resins, the PEN and PAN resins are capable of having the rate of thermal shrinkage increased in the direction of preform height, thus making it possible to provide a narrow-mouthed bottle having a substantially expanded body.

Effects of the Invention

The molding process and the synthetic resin bottle of this invention having the above construction has the effects described below. In the first place, the molding process of this invention ensures that the preform has a larger weight now that the initially formed preform has been taller than the bottle formed therefrom. Thus, the process allows the bottle to have a sufficient body wall thickness, even though the bottle has a narrow mouth and a substantially expanded body.

The larger the extent to which the preform is thermally shrunk, the higher the vertical draw ratio would be in the biaxial drawing and blow molding. When a high rate of thermal shrinkage is combined with the effect of drawing in the lateral direction, the resultant bottle would have higher rigidity.

The molding process of this invention ensures a large action-and-effect to be performed in the case of the preform having a bore diameter of 10 mm or less and the maximum diameter portion of the bottle body having a draw ratio of 2.0 times or more in the lateral direction.

In the case where the portions other than the mouth opening portion of the preform have a rate of thermal shrinkage in the range of 10 to 50%, effective weight increase can be expected for the preform.

The molding steps can be simplified by simultaneously conducting the thermal shrinkage of the preform and the preliminary heating for the biaxial drawing and blow molding step.

If the synthetic resin to be used is selected from the group comprising a polypropylene resin, a polyethylene naphthalate resin, and a polyacrylonitrile resin, then a relatively high rate of thermal shrinkage is obtained, and as a result, an effective increase in preform weight can be easily achieved.

The construction of the synthetic resin bottle of this invention can be achieved by the molding process of this invention combined with the biaxial drawing and blow molding step. The narrow-mouthed synthetic resin bottle made in the biaxially drawing and blow molding step has the following unique construction:

(1) The bottle is mainly characterized in that the mouth opening portion has a bore diameter of 10 mm or less and that the maximum diameter of the body is 2.5 times or more, or even 3.0 times or more, as much as the bore diameter of the mouth opening portion. Thus, there is provided a bottle having a narrow mouth and yet having a substantially expanded body.

(2) Sufficient body wall strength can be achieved by setting a minimum wall thickness of 0.45 mm or more for the maximum diameter portion of the body.

(3) A new shape element found in the neck portion is added to the bottle to give the bottle unique appearance. This neck portion, combined with a cap, gives an additional change to the bottle appearance. As a container for make-up liquids, such as mascaras or eyeliners, the bottle can be provided with a funnel-shaped squeezer, which can be fitted by utilizing an overhang formed at a lower end of an inner peripheral wall of the mouth opening portion during the time when the neck portion is formed.

(4) Although relatively uniform drawing is difficult for the PP resin, a narrow-mouthed PP resin bottle having a substantially expanded body can be provided by the molding process of this invention.

The above-described synthetic resin bottle of this invention has a narrow mouth and yet has a substantially expanded body. The bottle can also be provided with a slim neck portion. When used as a container for make-up liquids such as mascaras or eyeliners, the bottle should be differentiated from other products because of the new and unique shape.

DESCRIPTION OF REFERENCE SIGNS

Figure 1:
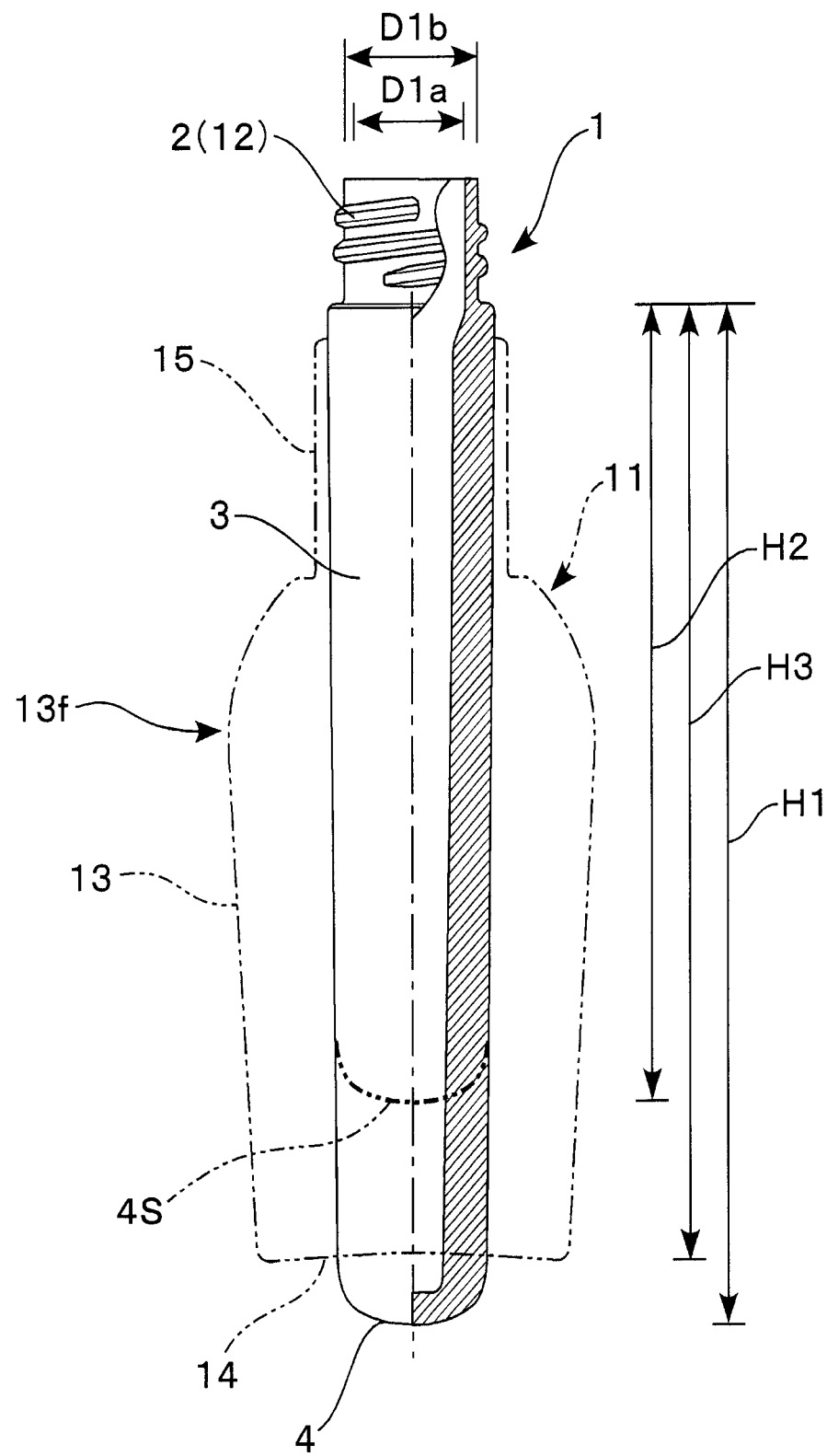
FIG. 1 is an explanatory diagram showing an embodiment of the molding process of this invention.

1. Preform
2. Mouth opening portion of preform
3. Body
4. Bottom
4S. Bottom (obtained after thermal shrinkage)

11. Bottle
12. Mouth opening portion of bottle
13. Body
13f. Maximum diameter portion
14. Bottom
15. Neck portion
16. Flat ring portion
17. Overhang
21. Cap
22. Application unit
22a. Shaft
22b. Brush
23. Built-in cylinder
23a. Squeezer
H1, H2, H3. Height
D1a. Bore diameter (of the mouth opening portion of the preform or the bottle)
D1b. Outer diameter (of the mouth opening portion of the preform or the bottle)
D2b. Outer diameter (of the bottle neck portion)
D3bx. Maximum outer diameter (of the bottle body)

PREFERRED EMBODIMENTS

Figure 2:
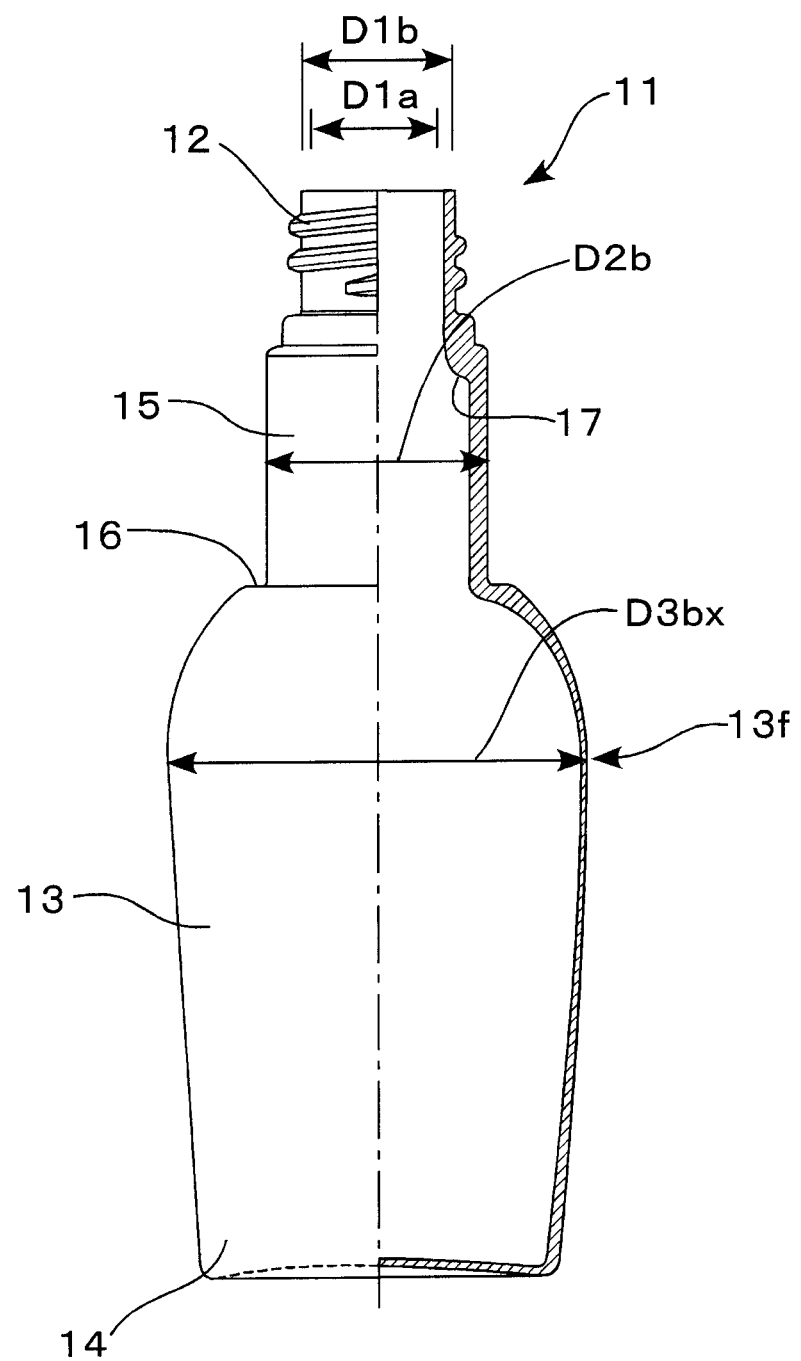
FIG. 2 is a front view of the bottle of this invention molded by the molding process shown in FIG. 1, with a right half portion shown in a vertical section.
Figure 3:
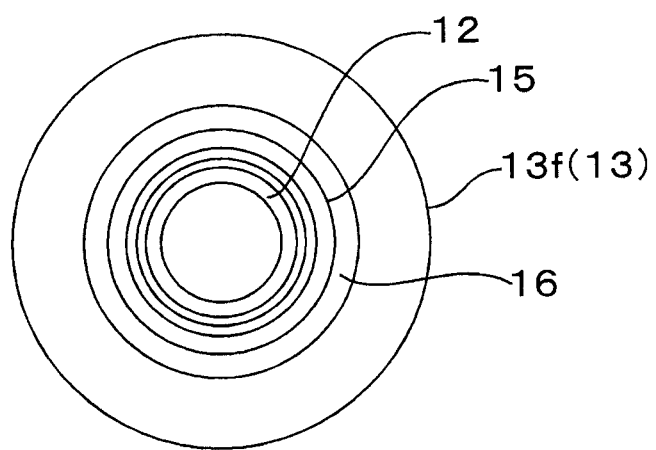
FIG. 3 is a plan view of the bottle shown in FIG. 2.
Figure 4:
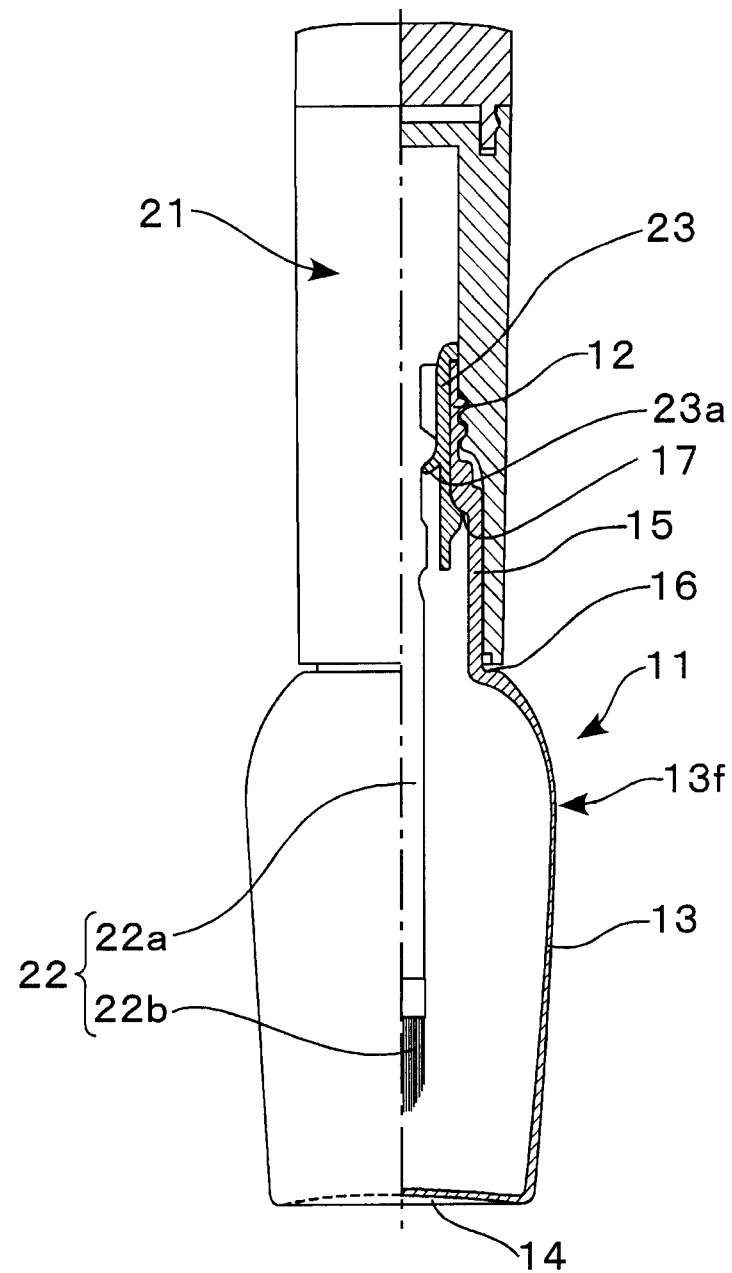
FIG. 4 is a front view, with the right half in a vertical section, of an example of the make-up container for mascara, in which the bottle of FIG. 1 is utilized as the container.

This invention is further described with respect to preferred embodiments, now referring to the drawings. FIG. 1 is an explanatory diagram showing an embodiment of the molding process of this invention combined with the biaxial drawing and blow molding step. For the convenience of showing dimensional relationships, the injection molded preform 1 (partly shown in the vertical section) is superimposed with the bottle 11 (a front view drawn by a chain double-dashed line), while respective mouth opening portions 2 and 12 are positionally aligned. FIG. 2 is a front view, with the right half in the vertical section, and FIG. 3, a plan view, respectively showing the embodiment of a synthetic resin bottle molded by the molding process shown in FIG. 1. FIG. 4 is a front view, with the right half in the vertical section, showing an example of a makeup container for mascara, in which this bottle is utilized.

The preform 1 made of a polypropylene resin has the following dimensions:
Total height: 69.8 mm
Height H1 excluding the mouth opening portion 2: 62.1 mm
Bore diameter D1a of the mouth opening portion 2: 8.3 mm
Outer diameter D1b of the mouth opening portion 2: 9.9 mm
Average outer diameter of the body 3: 11.6 mm
Wall thickness of the body 3: 3.05 mm
Weight: 4.4 g The bottle 11 shown in FIG. 2 is obtained by biaxially drawing and blow molding the above preform 1. The bottle 11 has a cylindrical neck portion 15, which has been blow molded to have a somewhat larger diameter than that of the mouth opening portion 12. Under the neck portion, and by way of a flatly disposed ring portion 16, the bottle has a body 13 blow molded in a substantially expanded shape. The bottle 11 has the following dimensions:
Bore diameter D1a of the mouth opening portion 12: 8.3 mm
Outer diameter D1b of the mouth opening portion 12: 9.9 mm
Total bottle height: 65.0 mm
Height H3 excluding that of the mouth opening portion 12: 57.3 mm
Outer diameter D2b of the neck portion 15: 14.0 mm
(The neck portion in this embodiment has the shape of a right circular cylinder, and the outer diameter D2b is equal to the minimum outer diameter.)
Maximum outer diameter D3bx of the body 13: 27.0 mm
Minimum wall thickness (n=6) for the maximum diameter portion 13f of the body 13: 0.55-0.61 mm The above dimensions indicate that the maximum outer diameter D3bx of the body 13 is 3.3 times as much as the bore diameter D1a of the mouth opening portion 12 and that the (minimum) outer diameter Db2 of the neck portion 15 is larger than the outer diameter D1b of the mouth opening portion 12 and is 1.7 times as much as the bore diameter D1a of the mouth opening portion 12.

Because cooling water is passed through the injection core mold, there is a limitation in decreasing the diameter of the core mold. The bore diameter of the body 3 of the preform 1 is thus determined by the diameter of this core mold. In the case of the above bottle 11 having a slim, cylindrical neck portion 15, attention has to be paid to the dragging that occurs in the vicinity of the split blow mold cavity where this neck portion 15 is formed (because dragging tends to occur more frequently if the bottle 11 has a flat ring portion 16 as in this embodiment), and also to the lateral draw ratio in the biaxial drawing and blow molding to form the neck portion 15. If these points are taken into consideration, the outer diameter of the body 3 of the preform 1 is larger by only about 2 mm than the outer diameter D1b of the mouth opening portion 2 at the longest. In the case of the preform in this embodiment, the mouth opening portion 2 has a bore diameter D1a of 10 mm or less, and the thickness of the body 3 of the preform 1 inevitably has an upper limit of about 3 mm.

The process for molding the preform 1 into the bottle 11 comprises the following steps of (1), (2), and (3):
(1) heating the body 3 and the bottom 4 of the preform 1 except for the mouth opening portion 2 to a temperature of 120 to 130° C. to make the portions other than the mouth opening portion 2 shrink from a height H1; (This heating step doubles as preliminary heating for the biaxial drawing and blow molding. Standard preliminary heating is usually conducted at a temperature of about 110° C., but in this case, a higher temperature of 120 to 130° C. is used so as to proceed with the thermal shrinkage to a large extent. Due to this thermal shrinkage, the bottom 4 goes up to the height position 4S as shown in FIG. 1 by a chain double-dashed line. The body 3 except for the mouth opening portion 12 would shrink to a height H2 of about 46 mm. The rate of shrinkage, calculated by a formula of ((H1-H2)/H1)×100, accounts for about 26 percent.)
(2) taking out from the heating furnace the preform 1 that has been thermally shrunk in the step of (1), and setting the shrunk preform in the split blow mold; and
(3) molding the bottle 11 in the biaxially drawing and blow molding step.

As described above, the preform 1 has a height H2 of 46 mm after the thermal shrinkage step (1). This height is considerably smaller than the height H3 of the bottle 11, and thus, the preform 1 can be set smoothly in the split blow mold. The vertical draw ratio in the biaxial drawing and blow molding, as calculated by H3/H2, is about 1.25 times. The lateral draw ratio for the maximum diameter portion 13f of the body 13 of the bottle 11 is about 2.3 times. At this ratio, the minimum thickness of the peripheral wall in this portion is in a range of 0.55 to 0.61 mm. In this range, the wall would be sufficiently rigid with no dent in the wall of the body 3 in ordinary handling of bottles.

If the preform was injection molded to give the height H1 of 46 mm, assuming a vertical draw ratio of 1.25 times but without thermal shrinkage as has been so in prior art, then the weight limit is about 3.4 g, and the minimum thickness of the peripheral wall in the maximum diameter portion would be in a range of 0.4 to 0.45 mm. Thus, it has been confirmed that according to the above embodiment associated with the molding process of this invention, the minimum wall thickness in the maximum diameter portion 13*f* of the body 13 of the bottle 11 can be increased by about 1.4 times.

An example of how the bottle 11 of this embodiment is used will be described below. FIG. 4 is a front view, with the right half in the vertical section, of an example of the make-up container for mascara, in which the bottle 11 of FIG. 2 is utilized as the container. The container comprises the bottle 11 and the roofed cylindrical cap 21 which is screwed on the mouth opening portion 12 of the bottle 11. The cap 21 is fitted around the neck portion 15, and softly covers the neck portion 15 to the lower end. From the roof ceiling hangs the application unit 22 comprising a shaft 22*a* and a brush 22*b* fitted at the front end of the shaft 22*a*.

A built-in cylinder 23 made of an elastomer resin is fitted firmly inside the mouth opening portion 12 in an area ranging from the upper end of the mouth opening portion 12 to the upper end of the neck portion 15. This built-in cylinder 23 is provided with a funnel-shaped squeezer 23*a* which performs a function of squeezing an extra amount of the make-up liquid from the brush 22*b*.

When the bottle 11 is molded, an overhang 17 is formed on the inner peripheral surface of the bottle 11 on the border between the mouth opening portion 12 and the neck portion 15. A locking mechanism is formed by using this overhang 17 to prevent the built-in cylinder 23 from slipping out of the mouth opening portion 12.

This invention has been described with respect to a preferred embodiment, but this invention should not be construed as limitative to the above embodiment. In addition to the PP resin, there are other synthetic resins, such as PEN and PAN resins, which have been used conventionally in the biaxial drawing and blow molding. All these resins have high rates of thermal shrinkage enough to adjust the height of the injection molded preform adequately in this invention. The above embodiment associated with the molding process comprises that the thermal shrinkage of the preform 1 doubles as the preliminary heating, but this step of thermal shrinkage may be separated from the preliminary heating step. The bottle of this invention does not necessarily have a limited use as a make-up container for mascaras and eyeliners described above in the embodiment.

INDUSTRIAL APPLICABILITY

As described above in details, the molding process of this invention can fully make up for the restricted upper limit to the preform body wall thickness. The bottle of this invention has a narrow mouth and yet has a substantially expanded body, and can be provided additionally with a slim neck portion. Because of its unique shape, the bottle is expected to have wide use in the field of narrow-mouthed bottles to be used as the containers for mascaras and eyeliners.

The invention claimed is:

1. A synthetic resin bottle which is a biaxially drawn, blow molded bottle, comprising:
    a body portion with a flat cross section having a circular shape;
    a mouth opening portion disposed on a body, the mouth opening portion having a bore diameter of 10 mm or less; and
    a cylindrical shaped neck portion disposed between the mouth opening portion and the body,
    wherein a maximum diameter of the body is at least 2.5 times more than the bore diameter of the mouth opening portion,
    wherein a screw thread is notched on an outer peripheral surface of the mouth opening portion and a height of the mouth opening portion is formed to be less than a height of the neck portion,
    wherein a maximum diameter portion of the body has a minimum wall thickness of 0.45 mm or more,
    wherein the neck portion has a minimum outer diameter in a range from an outer diameter of the mouth opening portion to 2.0 times as much as the bore diameter of the mouth opening portion, and
    wherein a flat ring portion is disposed under the neck portion and between the neck portion and the body.

2. The synthetic resin bottle according to claim 1, wherein the maximum diameter of the body is 3.0 times or more as much as the bore diameter of the mouth opening portion.

3. The synthetic resin bottle according to claim 1, wherein a cap in a roofed cylindrical shape is screwed on the mouth opening portion so that the cap covers the neck portion.

4. The synthetic resin bottle according to claim 1, wherein the bottle is utilized as a container for accommodating a make-up liquid.

5. The synthetic resin bottle according to claim 1, wherein a polypropylene series resin is used as a synthetic resin material for the bottle.

6. The synthetic resin bottle according to claim 1, wherein a polyethylene naphthalate series resin or a polyacrylonitrile series resin is used as a synthetic resin material for the bottle.

7. The synthetic resin bottle according to claim 1, wherein an overhang is formed on an inner peripheral surface of the bottle on a border between the mouth opening portion and the neck portion, a locking mechanism being formed using the overhang.

* * * * *